United States Patent [19]
Zipprich et al.

[11] 3,949,720
[45] Apr. 13, 1976

[54] FUEL CONTAINER SYSTEMS

[76] Inventors: Charles F. Zipprich, 20 Locust Ave., Troy, N.Y. 12180; Harvey R. Prins, Box 107 R.D. No. 1, Averill Park, N.Y. 12018; Keith M. Gagnier, Box 214, Poestenkill, N.Y. 12140

[22] Filed: Feb. 25, 1974

[21] Appl. No.: 445,457

[52] U.S. Cl. ............................. 123/136; 220/85 B
[51] Int. Cl.[2] ......................................... B65D 25/38
[58] Field of Search ................... 123/136; 220/85 B

[56] References Cited
UNITED STATES PATENTS

| | | | |
|---|---|---|---|
| 3,409,714 | 11/1968 | Strugar | 123/136 |
| 3,477,611 | 11/1969 | Niles | 220/85 B |
| 3,534,884 | 10/1970 | Suter | 220/85 B |
| 3,617,034 | 11/1971 | Skinner | 220/85 B |

*Primary Examiner*—Wendell E. Burns
*Assistant Examiner*—James W. Cranson, Jr.
*Attorney, Agent, or Firm*—William G. Rhines

[57] ABSTRACT

This invention, in one embodiment useful as a vehicular fuel container, includes as rigid outer tank, a collapsible inner bladder, expansion volumes positioned between said tank and said bladder, and means for causing fuel vapors to be removed from the bladder and injected into the vehicle carburation system for subsequent combustion.

6 Claims, 1 Drawing Figure

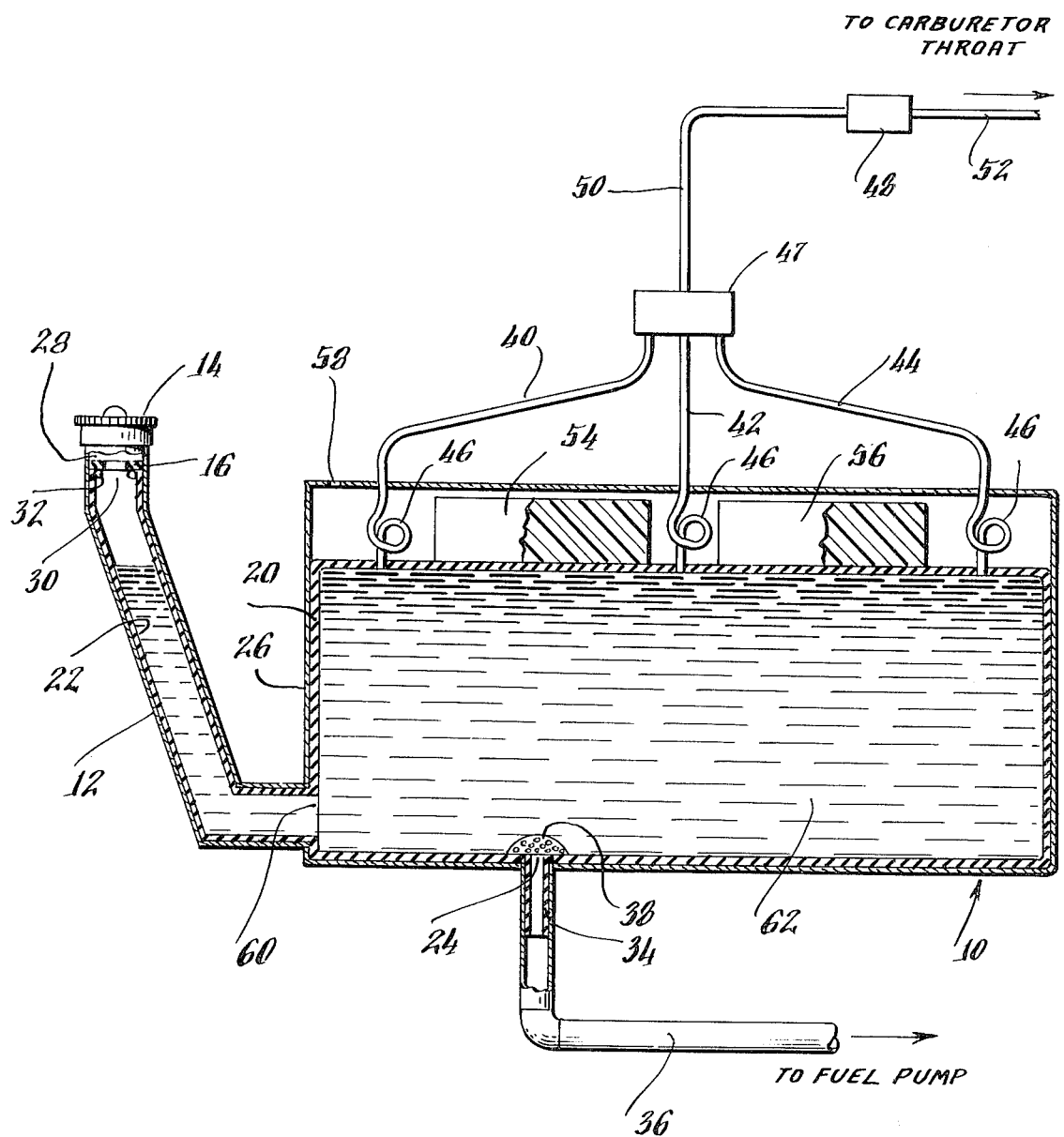

FUEL CONTAINER SYSTEMS

BACKGROUND OF THE INVENTION

From time to time in the past, there has been interest in reducing wastage of hydrocarbon fuels such as gasoline, primarily as an economy measure. Recently, however, there has been renewed interest in reducing such wastage, to avoid polluting the atmosphere, and more recently, because of the actual shortages of gasoline and other fuel and their rising costs, to save fuel. For these reasons, an objective, as to gasoline for example, is to restrict the emission of hydrocarbonaceous materials from the gasoline into the atmosphere.

The emission of hydrocarbons from gasoline into the atmosphere can be divided into two categories: (1) emissions from incomplete combustion in the operation of motor vehicles and (2) emissions in the handling of the gasoline before the combustion process occurs. From the following data, the relative magnitude of each category can be appreciated.

The Environmental Protection Agency gives an average figure of hydrocarbon emission from incomplete combustion of 200 pounds per 1,000 gallons of gasoline consumed in a vehicle with no control devices. U.S. federal New Car Emission Standards adopted for the 1975 model year require that emissions not exceed 0.46 grams per mile. Using the average mileage figure of 14.4 miles per gallon, this emission limit is equivalent to 14.6 pounds per 1,000 gallons. Information currently available indicated that further reductions in this category are not economically feasible.

A study of the typical pattern of gasoline storage and handling reveals five major points of hydrocarbon emission before the combustion process occurs: (a) Breathing and filling losses from storage tanks at refineries and bulk terminals; (b) Filling losses from loading tank trucks at refineries and bulk terminals; (c) Filling losses from loading underground storage tanks at service stations; (d) Spillage and filling losses in filling automobile gas tanks at service stations; and (e) Evaporation losses from the carburetor and gas tank of motor vehicles.

Breathing loss has been defined as the loss associated with the thermal expansion and contraction of the vapor space resulting from temperature cycles. Filling loss has been defined as the loss due to vapors being expelled from a tank by displacement as a result of filling.

In "splash filling," the gasoline enters the top of the fill pipe and then has a free fall to the liquid surface in the tank. The free falling tends to break up the liquid stream into droplets. As these droplets strike the liquid surface, they carry entrained air into the liquid and a kind of boiling action results as this air escapes up through the liquid surface. The net effect of these actions is the creation of additional vapors in the tank. In "submerged filling," the gasoline flows to the bottom of the tank through the fill pipe and enters below the surface of the liquid. This method of filling creates very little disturbance in the liquid bath and, consequently, less vapor formation than splash filling.

The following table is from data from the publication "Compilation of Air Pollutant Emission Factors" -999-AP-42 published by the U.S. Environmental Protection Agency.

| Point of emission | Hydorcarbon Emissions lb/1000 gal. of throughput |
|---|---|
| Filling tank vehicles | |
| Splash filling | 8.2 |
| Submerged filling | 4.9 |
| 50% splash filling and 50% submerged filling | 6.4 |
| Filling service station tanks | |
| Splash filling | 11.5 |
| Submerged filling | 7.3 |
| 50% splash fill and 50% submerged filling | 9.4 |
| Filling automobile tanks | 11.6 |
| Automobile evaporation losses (gas tank and carburetor) | 92 |

From the above data, it can readily be seen that emissions from filling are a significant problem.

It is also known that in the standard rigid steel automotive gasoline tank, there is a substantial amount of "sloshing" of the fuel as the vehicle moves. This results in a kind of "boiling" action similar to that described above as being experienced with "splash filling." The result is that a substantial amount of gasoline vapor is constantly being generated within the tank, and the amount of vapor so generated becomes increasingly substantial as the level in the tank drops from the completely full condition as more space becomes available. This phenomenon increases any given fuel level to a point where the atmosphere immediately above the gasoline becomes saturated. To maintain such a saturated condition, however, is made more difficult if not impossible by the practice of "venting," that is, in the past provision has been made to permit pressure differentials between the interior and the exterior of the tank to be relieved. This is necessary because the volume increases due to vaporization of the fuel from "sloshing" or temperature rises could otherwise become so substantial as to cause the tank to burst. Conversely, as "sloshing" subsides, and/or temperature drops, and/or gasoline is removed from the tank the resulting vacuum within the tank can become so substantial as to cause the tank to buckle. The usual method of coping with these considerations in the past has been to vent the tank to the atmosphere, but the result of this has been a signicant amount of "breathing," and consequent loss of the lowest boiling point constituents of the gasoline, which are valuable energy sources and are believed to be potent as chemical causes and reactants to produce objectionable environmental contamination and conditions such as the well-known California "smog."

In the past, various attempts have been made to inhibit such fuel loss and/or contamination phenomena. Some of the devices which have been suggested for coping with these problems have included floating a slab of plastic or foam rubber on the surface of the fuel, and the use of a vacuum relief valve and a pressure relief valve in the tank. In this connection reference is made to Shiobara U.S. Pat. No. 3,653,537. Such suggestions have had limited acceptance, however, due to their comparatively complex structure and limited effectiveness.

Accordingly, it is an object of the present invention to provide a means to decrease the loss of vapors from vehicular fuel storage systems to the atmosphere.

It is another object of the present invention to provide a means for decreasing the loss of vapors from vehicular fuel storage systems which is simple in structure, functionally reliable and effective, and inexpensive to produce and maintain.

SUMMARY OF INVENTION

Various beneficial objects may be achieved through practice of the present invention which, in one embodiment useful as a vehicular fuel storage apparatus, comprises the combination of a rigid outer tank, a collapsible liner positioned within the outer tank, and means for removing vapors from the top of the liner, and in another embodiment comprises the sub-combination of the vapor removing means comprising one or more conduit means for conducting said vapors from the top of the liner into the carburetion system of the associated vehicle with one or more liquid check valves positioned in the flow paths of said conduit means.

DESCRIPTION OF DRAWINGS

This invention may be more clearly understood from the description of preferred embodiments which follows, and from the attached drawing in which FIG. 1 illustrates a preferred embodiment of the present invention.

DESCRIPTION OF PREFERRED EMBODIMENTS

FIG. 1 illustrates preferred embodiment of the present invention. Illustration therein is a rigid outer tank or 10 made from steel or other strong durable material which will provide sufficient structural support, although the shape of the tank 10 is not critical, typically is described as a rectangular solid more or less and preferably, it is made in top and bottom component sections which can be bolted together or otherwise easily engaged and disengaged from each other to facilitate repair, removal, and/or replacement of the liner 20 hereinafter described. The tank 10 should have interior walls which are substantially smooth and free of burrs or other irregularities which might harm the lower 20 and, to this end, may even be coated with felt, foam-rubber, or other material which will avoid damage to the liner 20. The outer tank 10 has a filler pipe 12 leading to the bottom region of the tank 10. A filler cap 14 is positioned at the opening 28 of the filler pipe 12, and preferably is of a type which will require that some degree of pressure or vacuum will be present within the tank before any vapors are vented therefrom or air sucked into the tank as a means to further prevent pollution of the atmosphere and/or loss of fuel. An additional structural feature which may be incorporated into the filler pipe near its top is an inlet closure 16 made from relatively soft flexible material which is sufficiently chemically tolerant of gasoline and other hydrocarbons to avoid severe deterioration. As shown, it forms a constriction in the mouth of the filler pipe 12 which will closely enfold the outside of the fuel pump nozzle when filling is taking place, thereby further minimizing the discharge of fuel vapors into the atmosphere at that time. It is also possible to utilize the closure 16 to control the type of fuel which may be put into the tank. Thus, under certain regulations, it may be permissable to use leaded or non-leaded gasoline in trucks, but only non-leaded gasoline in autos. In that case, the nozzle of the gasoline pump for non-leaded gasoline could be of a smaller diameter than the nozzle for leaded gasoline, and correspondingly the inlet closure 16 for autos would be smaller than that for trucks, thus making it impossible to insert the non-leaded gasoline pump nozzle into the filler pipe of an automobile.

Positioned within the outer tank 10 is a liner 20. It conforms in outer shape and dimensions substantially with the shape and dimensions of the inside of the tank 10, and is "continuous," i.e., a liquid tight bag which is completely closed except for the filling neck 22 and a fuel feed line opening 24 and vapor return lines 40, 42, 44. It is made from supple material which will render it readily collapsible and is chemically tolerant to the materials to which it is exposed. In form, it comprises a main body portion 26 positioned within the tank 10 and a filling neck portion 22 positioned within the filler pipe 12 whereby gasoline poured into the top opening 28 of the filler pipe 12 will be caused to flow into the interior of the main body portion 26 of the liner 20 since the open end 30 of the neck portion 22 is secured in liquid-tight fashion to the interior of the filler pipe 12 by means of adhesives, an expansion ring 32, and/or other known per se sealing means.

An opening 24, preferably with a neck portion 34 is positioned at the bottom of the liner 20, juxtaposed to the vehicle fuel line 36 by which fuel may be transferred to the vehicle's engine fuel pump (not shown). Optionally, but desirably, fuel line filter in the form of a screen 38 is positioned over the opening 24 to ensure that foreign objects which may get into the liner 20 are not passed along with the fuel into the vehicle's engine.

Positioned at the top of the main portion 26 of the liner 20 and communicating with the interior thereof are one or more conduit means in the form of tubes 40, 42, 44, each of which has expansion loops 46, or convolutions (not shown) or other means by which the length of the tubes within the tank 10 may effectively be lengthened or shortened as the top of the liner 20 raises or lowers as hereinafter described, without materially interrupting the ability of the tubes to transport vapor. As illustrated, the conduit means converge in a common liquid check valve 47. It will be obvious from the discussion which follows, however, that a multiplicity of individual check valves, one each in one or more of the tubes, might also be effectively used. The purpose of each check valve, whether individual or multiple, is to permit only vapors to pass through the conduit means but no significant amounts of liquid. Their internal structure is not illustrated because the design and structure of such devices is well known per se.

An adjustable relief valve 48 is positioned on the opposite side of the liquid check valve(s) from the tubes 40, 42, 44, in communicating continuity therewith by means of an extension of the conduit means thereto in the form of tube 50. The other side of the relief valve 48 is connected to a suction producing means (not shown) such as the venturi in the vehicle carburetor, by means of a further extension of the conduit means in the form of tube 52. The purpose of the relief valve 48 is to establish a minimum amount of vacuum in the conduit means which must be exceeded before the suction means will begin to suck vapor via the conduit means from the top of the liner 20, and as such it is adjustable by mechanisms which are known per se so that the amount of such vacuum may be selected and/or regulated. By this means, the delivery of vapors into the vehicle carburetion system as hereinafter described may be selectively prohibited, as for example, when the engine is idling and duel mixture continuity is more critical. Positioned between the outside of the top of the main portion 26 of the liner 20 and the inside of the top of the tank 10 are air filled expansion volumes 54, 56 in the form of closed, air filled bladders, or foam rubber block, or other compressible and/or volume displaceable bodies whereby, as the top of the liner 20 closes in toward the inside of the tank 10 as the liner 20 is being filled, increasing resistance to further expansion of the liner 10 will be provided to prevent overfill and to relieve pressure buildup from thermal expansion of the fuel. The tank 10 also has a vent 58 in its top, whereby air may enter or leave the interior of the tank 10 as the liner 20 inflates or deflates. In use, the device as illustrated operates as follows.

When the device is installed on the vehicle, the liner 20 will be in place within the tank 10 and will be collapsed with no air or fuel in it. To fill the tank, the filler cap 14, is removed and the nozzle from the gasoline fueling station is inserted in the closed inlet 30. The pump is turned on and gasoline 62 flows down the neck portion 22 of the liner 20 positioned within filler pipe 12, through the fuel inlet 60, and into the main body portion 26 of the rigid support container 10. The liner when filled conforms to the shape of the rigid support container. When the tank is filled the nozzle automatically shuts off and is withdrawn and the filler cap 14 replaced. During this operation some air usually will have been introduced into the liner 20. Basically this is the air present at the end of the nozzle which goes into the tank with the gasoline. In addition, air dissolved in the gasoline might also be released in the liner.

Upon start-up and operation of the engine, fuel is fed from the fuel outlet 24, through the fuel pump and to the carburetor in the normal fashion.

At fairly high engine speeds the vacuum in the "throat" or venturi of the carburetor is sufficient to open the relief valve 48. When this occurs, any hydrocarbon laden air or vapor present in the main body 26 of the liner 40 is drawn through the conduit means formed by the tubes 40, 42, 44, 50, 52, the liquid check valve, 47, and the relief valve, 48, and into the carburetor throat. From there, of course, it is introduced to the intake manifold and is burned in the engine. When substantially all such vapor is removed from the main portion 26 of the liner 20, liquid fuel 60 will enter one or more of the tubes 40, 42, 44, of the conduit means until such liquid fuel comes to the liquid check valve 47. At this point the check valve 47 will close and there will be no more flow through the conduit means. As the engine is run and fuel is used, the liner 20 collapses to whatever the volume of liquid left until it is necessary to refuel again.

During the entire process described above, substantially the only time air enters the system is during the fill cycle. Since the interior of the liner 20 is maintained substantially contiguous with the outside of the body of liquid throughout, vaporization from "sloshing" or temperature changes is minimized, so that vapor generation is kept to a minimal amount and is removed through the conduit means during engine operation and is burned.

Since it is only a comparatively small amount and is quickly removed from the liner 20, there is little affect on engine operation. In addition, little or no air that has been in contact with gasoline can reach the atmosphere and therefore evaporative emissions from the fuel tank during the fill cycle and engine operation are minimized thereby reducing pollution of the air and energy losses through fuel evaporation and/or venting. Air, of course, enters the rigid container during collapse of the liner and is ejected during the fill cycle. However, this air has only been in contact with the outside of the liner and therefore contains no significant amount of hydrocarbons which cause pollution.

The expansion volumes 54, 56 come into play if the tank is filled and its contents expand as when it is allowed to stand in an area where the fuel will warm up. If this should occur the air in the expansion volumes 54, 56 compresses by the same amount the fuel expands. At less than full conditions, the liner will expand and collapse as the fuel warms up or cools in response to environmental conditions. Again, since no air is lost from the liner then, there is no evaporation loss during the breathing cycle.

The system described above is particularly suitable for use in automobiles, however, it is also applicable to other systems and processes involved with relatively low vapor pressure liquids. Examples include other types of internal combustion engines systems such as trucks, motorcycles, etc. The transfer and storage of fuel at gasoline stations, and the transfer and storage of low vapor-pressure liquids in industrial applications.

EXAMPLE

A system substantially like the embodiment described above was installed in a 1972 Chevrolet van powered with a 350 cubic unit V-8 engine. Two types of tests were conducted, one in neutral at various engine speeds and a second on the road under normal operating conditions. The adjustable relief valve was connected to the carburetor throat through a tee in the vacuum advance line.

The engine functioned normally in all respects during these tests and no difficulty was encountered either in filling the liner or in feeding gasoline to the fuel pump. Air was artifically introduced into the liner to determine if the vent system worked properly and if introduction of this air into the engine would affect operation. In all cases air was drawn from the liner when the vacuum at the carburetor throat was 5 psi or above. This occured until no air was left in the liner at which point fuel entered the check valve and shut it off.

It is to be understood that the preceding discussion, and that embodiments of the present invention discussed therein and illustrated in the attached drawings and as Claimed, are by way of illustration and not of limitation, and that a wide variety of embodiments of the present invention may be practiced by those skilled in the arts without departing from the spirit or scope of this invention.

I claim:

1. In a vehicular fuel system, fuel storage apparatus comprising the combination of
   a rigid outer container having a filler opening,
   a continuous collapsible liner positioned within said outer container, the interior of which liner is accessible via an opening positioned inside said filler opening, said liner being without flotation material positioned at the underside of the top of said liner that would form pockets.
   resilient, compressible, expansion volume devices positioned between the outside of the top of said liner and the inside of the top of said outer container,
   and means for removing vapor from the top of the interior of said collapsible liner which comprises conduit means for conducting vapor away from said collapsible liner, suction producing means connected to said conduit means, and liquid check valve means positioned in the flow path formed by said conduit means between said collapsible liner and said suction producing means.

2. The apparatus described in claim 1 wherein said suction producing means is the carburetor of said vehicle.

3. The apparatus described in claim 1 in which said expansion devices comprise at least one air filled bladder.

4. The apparatus described in claim 2 in which said expansion devices comprise at least one air filled bladder.

5. The apparatus described in claim 1 in which said expansion devices comprise at least one foam rubber block.

6. The apparatus described in claim 5 in which said expansion devices comprise at least one foam rubber block.

* * * * *